(12) United States Patent
Jung et al.

(10) Patent No.: US 9,863,077 B2
(45) Date of Patent: Jan. 9, 2018

(54) LAUNDRY TREATMENT MACHINE

(71) Applicant: LG ELECTRONICS INC., Seoul (KR)

(72) Inventors: Hwanjin Jung, Seoul (KR); Naeun Kim, Seoul (KR); Sanghyun Lee, Seoul (KR); Bonkwon Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/923,827

(22) Filed: Oct. 27, 2015

(65) Prior Publication Data

US 2016/0115632 A1    Apr. 28, 2016

(30) Foreign Application Priority Data

Oct. 27, 2014    (KR) .......................... 10-2014-0146384

(51) Int. Cl.
| | |
|---|---|
| *D06F 33/02* | (2006.01) |
| *D06F 39/08* | (2006.01) |
| *H02P 1/16* | (2006.01) |
| *H02P 3/06* | (2006.01) |
| *H02P 29/02* | (2016.01) |

(52) U.S. Cl.
CPC ............ *D06F 33/02* (2013.01); *D06F 39/087* (2013.01); *H02P 29/02* (2013.01); *D06F 39/083* (2013.01); *D06F 39/085* (2013.01); *D06F 2202/065* (2013.01); *D06F 2202/085* (2013.01); *D06F 2202/12* (2013.01); *D06F 2204/08* (2013.01); *D06F 2204/084* (2013.01); *D06F 2204/10* (2013.01); *D06F 2214/00* (2013.01); *D06F 2220/00* (2013.01); *H02P 1/16* (2013.01); *H02P 3/06* (2013.01)

(58) Field of Classification Search
CPC ...... D06F 33/02; D06F 39/083; D06F 39/085; D06F 39/087; D06F 2202/065; D06F 2202/085; D06F 2202/12; D06F 2204/08; D06F 2204/084; D06F 2204/10; D06F 2214/00; D06F 2220/00; H02P 1/16; H02P 3/06; H02P 29/02
USPC ........... 68/12.02, 12.05, 12.16, 12.19, 12.21, 68/12.23, 12.27, 133, 140
See application file for complete search history.

(56) References Cited

U.S. PATENT DOCUMENTS

2012/0005840 A1*  1/2012  Jang ....................... D06F 33/02
                                                          8/137

* cited by examiner

*Primary Examiner* — Levon J Shahinian
(74) *Attorney, Agent, or Firm* — Fish & Richardson P.C.

(57) ABSTRACT

A washing machine is disclosed. The washing machine includes a pump that is configured to drain or circulate water and that comprises a motor that is configured to operate the pump. The washing machine further includes a motor driver that is configured to supply operation power to the motor. The washing machine further includes a motor controller that is configured to set a rotation speed of the motor and that is configured to supply, to the motor driver, a signal that controls the motor. The washing machine further includes a current sensor that is configured to measure a current supplied from the motor driver to the motor. The washing machine further includes a speed sensor. The washing machine further includes a water level sensor. The washing machine further includes a main controller that is configured to start or stop operation of the motor by supplying a control command.

10 Claims, 5 Drawing Sheets

LAUNDRY TREATMENT MACHINE

CROSS-REFERENCE TO RELATED APPLICATION

This application claims the priority benefit of Korean Patent Application No. 10-2014-0146384, filed on Oct. 27, 2014 in the Korean Intellectual Property Office, the disclosure of which is incorporated herein by reference.

FIELD

The present disclosure relates to a laundry treatment machine.

BACKGROUND

In general, a laundry treatment machine performs a washing process using friction between laundry and a tub, which rotates by receiving a driving force from a motor, after detergent, water and the laundry are inserted into the tub, and thus can wash the laundry without damaging or tangling the laundry.

The general laundry treatment machine is configured to supply water into the tub, drain a part of water, supply water again, and then completely drain water as a washing process proceeds.

To circulate or drain water, the laundry treatment machine includes a pump attached to a drain hose connected to the tub, and the pump includes a motor. As the pump operates due to the motor, water flowing toward a drain is supplied into the tub again through a circulation hose or is drained through the drain hose.

SUMMARY

When the flow of water is controlled as described above, the pump can brake if the pump continues operating after water is completely drained or stops operating while water is not completely drained.

In addition, if the drain is clogged with foreign substances, water is not normally drained. In this case, since water is not completely drained, the pump continues operating and thus is overloaded due to the abnormal flow of water.

An innovative aspect of the subject matter described in this specification may be implemented in a washing machine that includes a pump that is configured to drain or circulate water and that comprises a motor that is configured to operate the pump; a motor driver that is configured to supply operation power to the motor; a motor controller that is configured to set a rotation speed of the motor and that is configured to supply, to the motor driver, a signal that controls the motor; a current sensor that is configured to measure a current supplied from the motor driver to the motor; a speed sensor that is configured to measure the rotation speed of the motor; a water level sensor that is configured to measure a level of water in a tub; and a main controller that is configured to start or stop operation of the motor by supplying, to the motor controller, a control command. The main controller is configured to stop the motor in response to determining a load state of water and determining whether the level of water is zero by measuring current using the current sensor and the rotation speed of the motor using the speed sensor.

These and other implementations can each optionally include one or more of the following features. The motor controller is configured to stop the motor in response to a zero water level sensing signal or an overcurrent sensing signal from the main controller. The main controller is configured to determine whether overcurrent occurs or determine the load state based on the rotation speed of the motor being reduced and the current being increased. The main controller is configured to determine whether the level of water is zero based on the rotation speed being increased and the current being reduced. The main controller is configured to stop the motor based on the rotation speed being increased by at least a certain rate. The main controller is configured to stop the motor based on the rotation speed being increased by at least 33%.

The main controller is configured to stop the motor based on the current being reduced by at least a certain value. The main controller is configured to stop the motor based on the current being reduced by at least 90%. The main controller is configured to count a number of times that the motor stops; and determine whether water is completely drained by measuring the level of water using the water level sensor based on the number of times that the motor stops being equal to or greater than a reference number. The main controller is configured to count a number of times that the motor stops; and control the motor to stop and then to be driven again after a specific period of time based on the number of times that the motor stops being less than a reference number.

Another innovative aspect of the subject matter described in this specification may be implemented in a method for controlling a washing machine that includes the actions of draining water by operating a pump based on a water drain command being applied; measuring current and a rotation speed of the motor; determining whether the current or the rotation speed varies by at least a specific reference value; stopping the motor based on the current or the rotation speed varying by at least the reference value; and draining water after a specific period of time passes by driving the motor.

These and other implementations can each optionally include one or more of the following features. The action of the determining comprises determining whether the current is reduced by 90% or more of a pre-measured current. The action of the determining comprises determining whether the rotation speed is increased by 33% or more of a pre-measured rotation speed. The actions further include counting a number of times that the motor stops. The motor is driven again after a specific period of time passes based on the number of times that the motor stops being less than a reference number. The actions further include sensing a level of water based on the number of times that the motor stops being equal to or greater than the reference number; and after sensing the level of water, driving the motor again based on water not being drained.

Therefore, it is an object of the subject matter described in this application to provide a laundry treatment machine for sensing a voltage applied to a motor included in a pump for circulation and drainage of water to determine a load state of water inside a tub, and controlling operation of the motor depending on the determined load state, and a method for controlling the laundry treatment machine.

DETAILED DESCRIPTION

Figure 1:
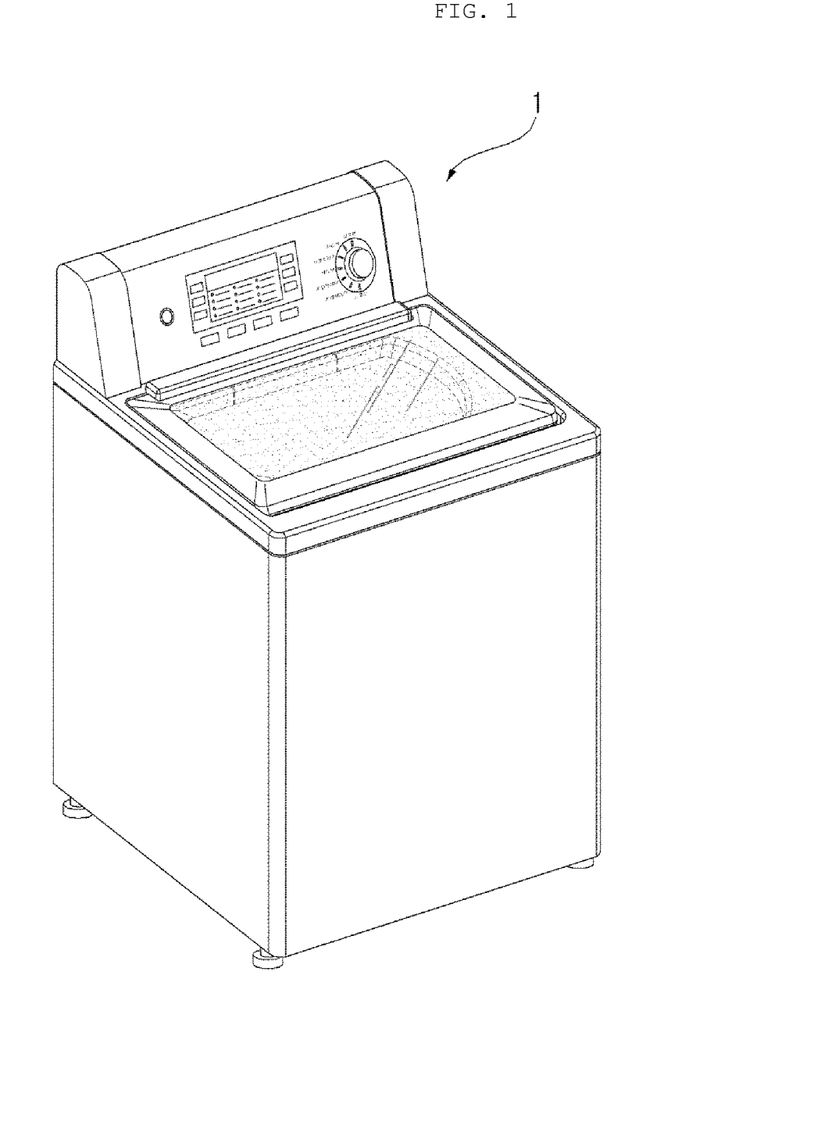
FIG. 1 is a perspective view of an example laundry treatment machine.
Figure 2:
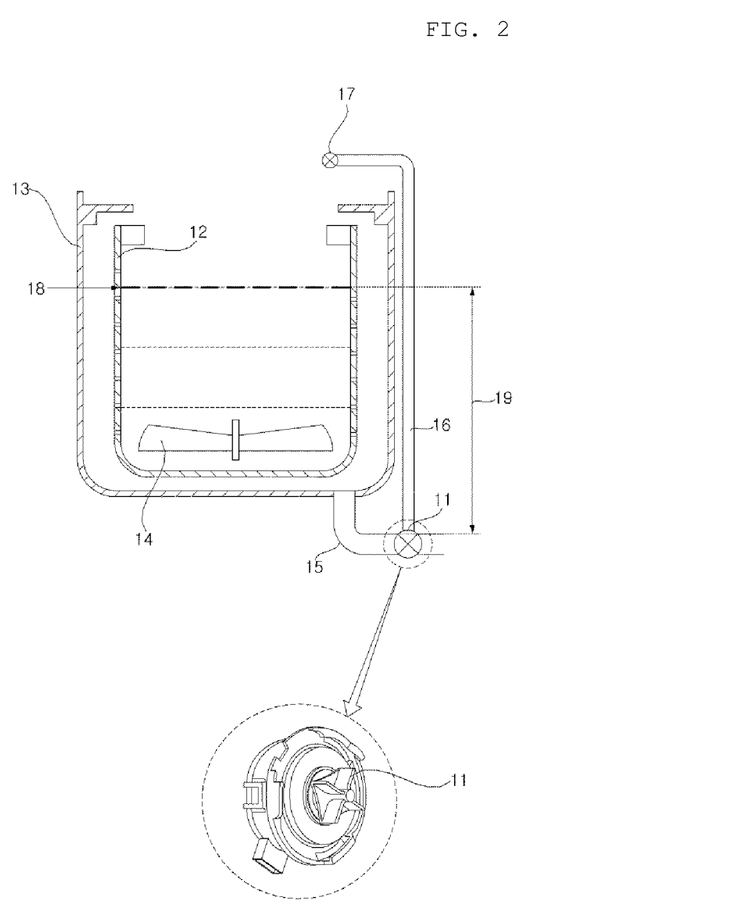
FIG. 2 is a schematic diagram of example configurations of a tub and a pump of a laundry treatment machine.

FIG. 1 illustrates an example laundry treatment machine 1, and FIG. 2 illustrates example configurations of a tub and a pump 11.

Referring to FIGS. 1 and 2, the laundry treatment machine 1 is a top-loading laundry treatment machine in which laundry is inserted into a tub from above. The top-loading laundry treatment machine includes the concept of a washing machine for performing washing, rinsing and spin-drying processes after laundry is inserted, or a drying machine for performing a drying process after wet laundry is inserted, and the following description is focused on the washing machine.

The washing machine 1 includes a casing for forming the exterior of the washing machine 1, manipulation keys for receiving a variety of control commands input by a user, a control panel for providing a user interface using, for example, a display for displaying information about an operation state of the washing machine 1, and a door for opening or closing an opening through which laundry enters or exits.

The control panel includes an input unit including a plurality of manipulation keys for manipulating an operation state of the laundry treatment machine 1, and a display unit for displaying the operation state of the laundry treatment machine 1.

The washing machine 1 includes the tub. The tub includes an outer tub 13 for accommodating water, and an inner tub 12 rotatably provided in the outer tub 13 to accommodate laundry.

The washing machine 1 may include a pulsator 14 rotatably provided at the bottom of the tub and, more particular, at the bottom of the inner tub 12.

A driving device provides a driving force for rotating the inner tub 12 and/or the pulsator 14. In addition, a clutch for selectively delivering the driving force of the driving device may be provided to rotate only the inner tub 12, to rotate only the pulsator 14, or to simultaneously rotate the inner tub 12 and the pulsator 14.

The inner tub 12 has a plurality of holes and thus water supplied into the inner tub 12 flows through the holes to the outer tub 13. A water inlet valve for opening or closing a water inlet hose may be provided to supply water into the tub.

Water in the outer tub 13 is drained through a drain hose 15, and a drain valve for opening or closing the drain hose 15, and the pump 11 for pumping water are provided.

In some implementations, the pump 11 discharges water through the drain hose 15 to the outside of the washing machine 1, or supplies water through a circulation hose 16 into the tub again, depending on a rotation direction thereof.

A spray nozzle 17 may be provided at an end of the circulation hose 16 and thus the circulated and re-supplied water may be sprayed.

When water is supplied into the tub through the water inlet hose, a water level sensor senses the level of water. In some implementations, if water is supplied to a first point 18, the level of water corresponds to a height from the location of the drain hose 15 to the first point 18 and a level 19 is measured.

Figure 3:
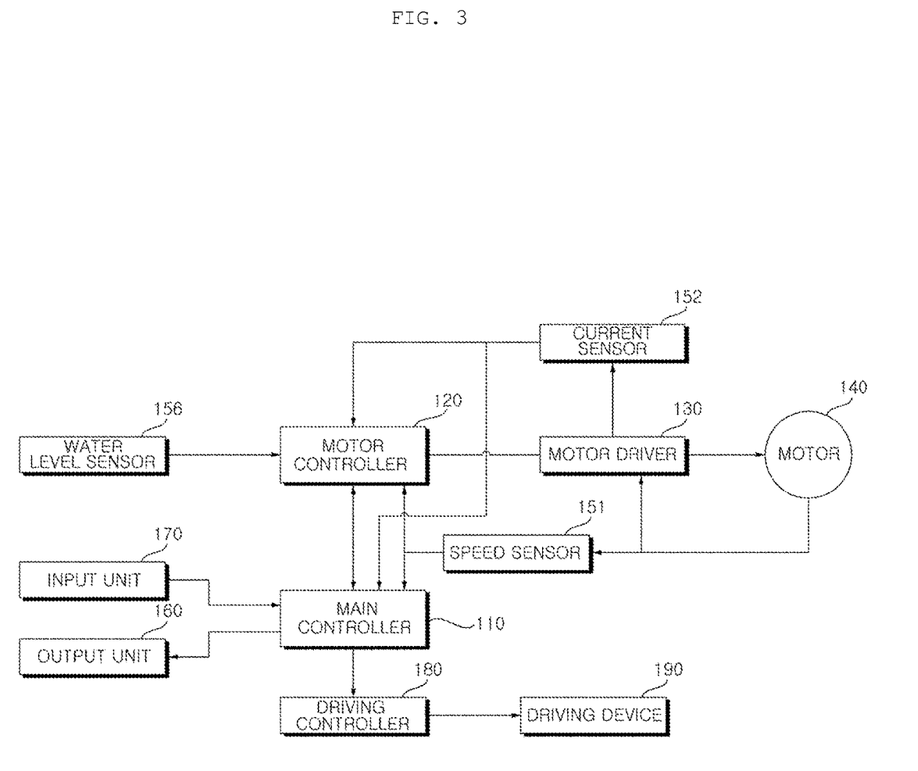
FIG. 3 is a block diagram of an example laundry treatment machine.

FIG. 3 illustrates an example laundry treatment machine 1.

The washing machine 1 includes an input unit 170, an output unit 160, a water level sensor 156, a current sensor 152, a motor controller 120, a motor driver 130, a motor 140, a speed sensor 151, a driving controller 180, a driving device 190, and a main controller 110 for providing overall control to the washing machine 1. The washing machine 1 may further include a storage for storing data.

In some implementations, the motor 140 is a motor of the pump 1 mounted on the drain hose 15 for drainage and circulation of water, and the motor controller 120 and the motor driver 130 are used to control operation of the motor 140 of the pump 11.

As an input means including the input unit 170 is manipulated, a specific signal is input to the main controller 110. The input unit 170 includes a plurality of manipulation keys provided on the control panel, and may further include a specific input means such as a touchpad.

The input unit 170 inputs setting data such as a washing mode, a washing temperature, a water level, or a reservation time, and inputs a control command for starting or stopping operation of the washing machine 1 depending on the setting data.

The output unit 160 outputs the setting data input through the input unit 170, e.g., the washing mode, the washing temperature, or the water level, and outputs process information such as a current washing process state and a remaining washing time.

The output unit 160 includes a display means for displaying the setting data or the process information in the form of text, a number, or an image. In addition, the output unit 160 may include a buzzer or a speaker for outputting a specific sound effect or an alarm, and a lamp to be turned on or off to output an operation state or a warning.

The storage stores basic data for controlling operation of the washing machine 1, control data for controlling the operation, input and output data, and data input from a plurality of sensors while the washing machine 1 operates.

The driving controller 180 controls the driving device 190 to rotate based on a control command of the main controller 110. The driving device 190 includes another motor that rotates under control of the driving controller 180. The driving device 190 rotates at least one of the pulsator 14 or the inner tub 12.

The water level sensor 156 includes at least one sensor and measures the water level 19 in the tub. As described above, if water is supplied to the first point 18, the water level 19 is measured and provided to the main controller 110 and the motor controller 120.

The motor controller 120 generates a control signal for driving the motor 140 to operate the pump 11 depending on a control command of the main controller 110. The control signal generated in this case is a switching control signal, e.g., a pulse width modulation (PWM) signal.

In addition, the motor controller 120 generates a revolutions per minute (RPM) signal for controlling a rotation speed of the motor 140, as a control signal depending on a sensed load state of water. This signal sets a target rotation speed of the motor 140 and is variable depending on the load state of water.

In some implementations, the motor controller 120 outputs the PWM signal through a resistor-capacitor (RC) filter in such a manner that the PWM signal is input to the motor driver 130, and the RPM signal corresponds to a speed control voltage VSP, is set within a range from direct-current (DC) 1V to 4V, and is input to the motor driver 130.

The motor driver 130 supplies a current having a specific magnitude as motor driving power to the motor 140 based on the control signals input from the motor controller 120, e.g., the PWM signal and the RPM signal. In some implementations, the motor driver 130 includes a sensorless integrated circuit (IC) and a protection circuit.

As such, the motor 140 rotates and water of the drain hose 15 is drained or circulated and supplied into the tub again.

The motor 140 is a motor included in the pump 11 as described above. In some implementations, the motor 140 is a brushless DC (BLDC) motor.

The motor 140 rotates clockwise or counterclockwise under control of the motor controller 120 and the motor driver 130, and thus the pump 11 drains or circulates water.

For example, water is drained if the motor 140 rotates clockwise, and is circulated and supplied through the circulation hose 16 into the tub again if the motor 140 rotates counterclockwise.

The current sensor 152 measures the current supplied from the motor driver 130 to the motor 140 and inputs the same to the motor controller 120. In addition, the current sensor 152 inputs the sensed current to the main controller 110. The current sensor 152 includes an amplifier.

The speed sensor 151 measures a rotation speed of the motor 140 and inputs the same to the motor controller 120. In some implementations, the speed sensor 151 measures the speed by receiving a voltage of the motor 140, and a comparative value between a DC link voltage and a distribution value, and calculates RPM corresponding to the voltage.

In addition, the speed sensor 151 inputs the rotation speed of the motor 140 to the main controller 110.

The main controller 110 controls input and output of data to and from the input unit 170 and the output unit 160, and controls the data to be stored in the storage. The main controller 110 sets operation of the washing machine 1 based on the setting data input through the input unit 170, and thus controls the washing machine 1 to operate. As such, the washing machine 1 performs a washing process, a rinsing process, and a spin-drying process. A washer & dryer may further perform a drying process. The main controller 110 controls the display of the output unit 160 to display a washing mode, a washing time, a spin-drying time, a rinsing time, or a current operation state.

When the washing machine 1 operates and starts to wash laundry, the main controller 110 controls the drain valve not to drain water and controls the water inlet valve to supply water into the tub.

The main controller 110 controls the pump 11 to operate while the washing process or the rinsing process is performed, in such a manner that water is supplied through the circulation hose 16 into the tub again, and applies a control command to the motor controller 120 to drain water when the washing process and the rinsing process are completed.

In some implementations, the motor controller 120 generates a control signal for operation of the pump 11 depending on the control command of the main controller 110, and applies the same to the motor driver 130, and the motor driver 130 supplies motor driving power to the motor 140 to operate the pump 11.

The main controller 110 receives the current of the motor 140 of the pump 11 from the current sensor 152, receives the rotation speed of the motor 140 from the speed sensor 151, and determines whether the level of water in the tub is zero based on the current and the rotation speed. In some implementations, the current input from the current sensor 152 and to the main controller 110 is a value converted by an analog to digital converter (ADC), and the rotation speed input from the speed sensor 151 to the main controller 110 is a speed signal timer-processed by an encoder.

In addition, the main controller 110 determines whether overcurrent occurs and determines the load of water, based on the current and the rotation speed of the motor 140.

The main controller 110 inputs the results of determining whether the level of water is zero, whether overcurrent occurs, and the load, to the motor controller 120. As such, the motor controller 120 receives a zero water level signal, an overcurrent signal, and load data from the main controller 110, and reflects the same in a control signal for controlling the motor 140 of the pump 11.

In some implementations, when a set process is performed, if the pump 11 operates for drainage or circulation of water, the main controller 110 applies a control command to the motor controller 120 to control the pump 11 to start operation depending on the water level of the water level sensor 156. Furthermore, the main controller 110 applies a control command to the motor controller 120 to control the pump 11 to stop operation depending on whether the level of water is zero, while the pump 11 operates.

In addition, the main controller 110 determines whether the washing machine 1 normally operates, based on data input from a plurality of sensors, and outputs an error through the output unit 160 if an error occurs.

Figure 4:
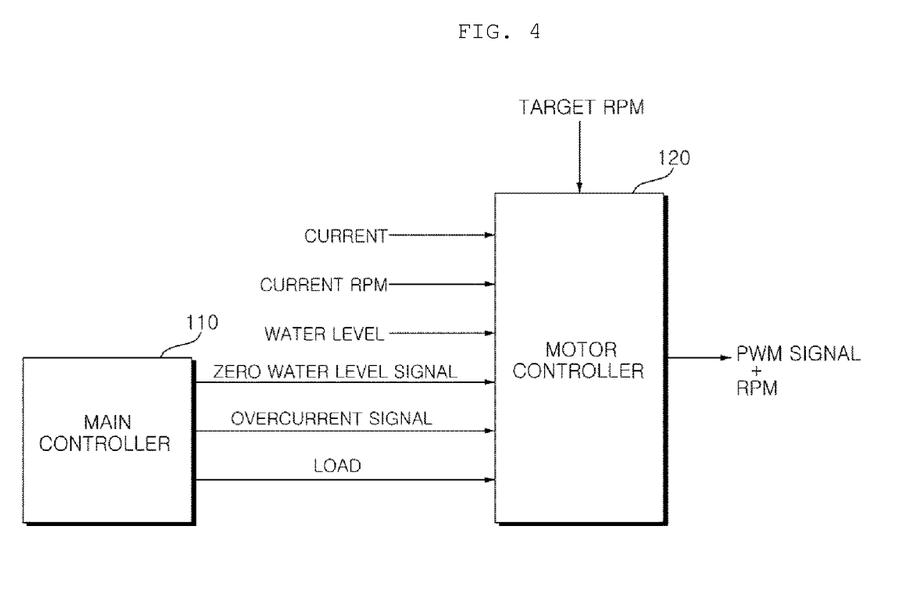
FIG. 4 is a schematic diagram of example signal information depending on sensing of a load of a laundry treatment machine.

FIG. 4 is a schematic diagram showing signal information depending on sensing of the load of the laundry treatment machine 1.

Referring to FIG. 4, the main controller 110 determines whether the level of water is zero, determines whether overcurrent occurs, and determines the load of water, based on the current of the motor 140, which is input from the current sensor 152, and the rotation speed (e.g., RPM) of the motor 140, which is input from the speed sensor 151.

The main controller 110 may determine that the level of water is zero, if the input rotation speed is increased and the current is reduced, according to a load sensing algorithm. In some implementations, the main controller 110 determines whether water is drained and the level of water is zero, in further consideration of the water level input from the water level sensor 156.

Based on the input rotation speed of the motor 140 of the pump 11 and the current, the main controller 110 determines the load of water and determines whether overcurrent occurs, if the rotation speed of the motor 140 of the pump 11 is reduced and the current is increased.

Depending on the determination result of the main controller 110, a zero water level signal, an overcurrent signal, and a load signal are input to the motor controller 120, and the current of the current sensor 152, the rotation speed of the speed sensor 151 (e.g., a currently measured RPM), and the water level of the water level sensor 156 are input to the motor controller 120. In addition, a target RPM of the motor 140 for driving the pump 11 is input from the main controller 110 to the motor controller 120.

The motor controller 120 generates a PWM signal based on the input data, sets a rotation speed of the motor 140, and inputs the rotation speed to the motor driver 130, and the motor driver 130 supplies driving power based thereon to the motor 140. The current sensor 152 senses and inputs an output current input from the motor driver 130 to the motor 140, to the motor controller 120 and the main controller 110, and measures and inputs a rotation speed of the speed sensor 151 to the motor controller 120 and the main controller 110 if the motor 140 operates.

As such, the motor controller 120 varies control of the motor 140 based on the target RPM, the actually measured RPM, and the current value in consideration of the load state of water, whether the level of water is zero, and whether overcurrent occurs.

In addition, the main controller 110 applies a control command to the motor controller 120 to stop or restart operation of the motor 140 based on the load state of water, whether the level of water is zero, whether overcurrent occurs, and variations in current value and rotation speed.

Figure 5:
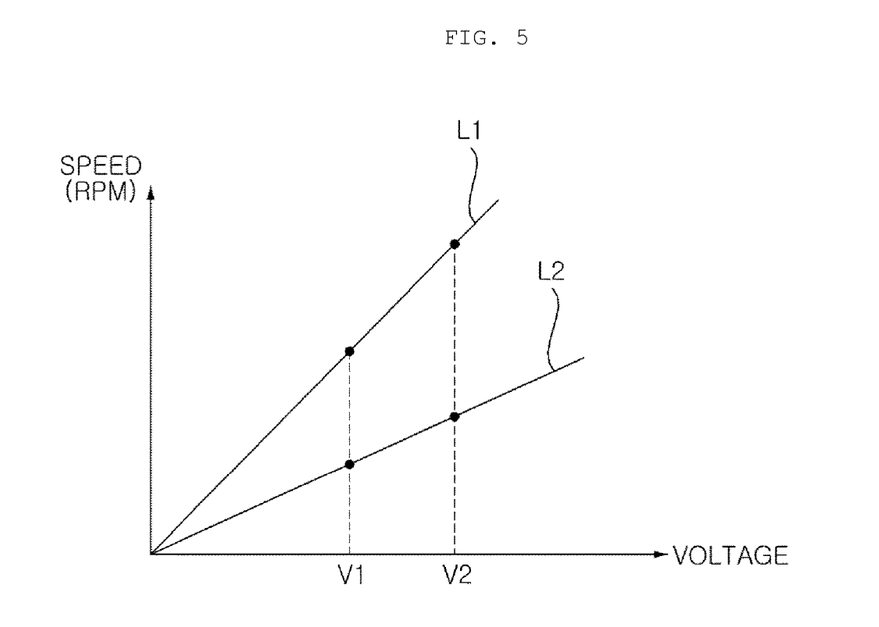
FIG. 5 is a graph of an example relationship between a voltage and a rotation speed of a motor controlling the laundry treatment machine.

FIG. 5 illustrates an example relationship between a voltage and a rotation speed of the motor 140 in controlling the laundry treatment machine 1. In some implementations, a first line L1 shows an unloaded state, and a second line L2 shows a loaded state of water.

As illustrated in FIG. 5, a rotation speed RPM of the motor 140 is increased in proportion to a speed control voltage VSP of the motor controller 120.

In addition, when water is present in the tub, the relationship between the voltage and the rotation speed in the loaded state and the relationship in the unloaded state (e.g., zero water level) are compared as described below. At the same speed control voltage, the rotation speed of the motor 140 measured when water is not loaded (e.g., when the level of water is zero) is higher compared to that measured when water is present.

If cases of a first voltage V1 and a second voltage V2 are compared, the rotation speed of the motor 140 is increased in proportion to the voltage depending on the load of the water.

Accordingly, if a timing when water starts to be drained, a timing when the level of water is a half of an initial water level, and a timing when water is completely drained and thus the level of water is zero water are compared, the rotation speed of the motor 140 of the pump 11 is increased as the load of water is reduced.

In some implementations, if a drain filter is clogged with foreign substances, water may not be normally drained and thus a current for driving the motor 140 may be increased. In addition, it may be determined whether water is normally drained, based on a variation in the rotation speed of the motor 140 measured for a preset drain time.

As such, the main controller 110 may determine that an error occurs and thus output the error through the output unit 160.

Figure 6:
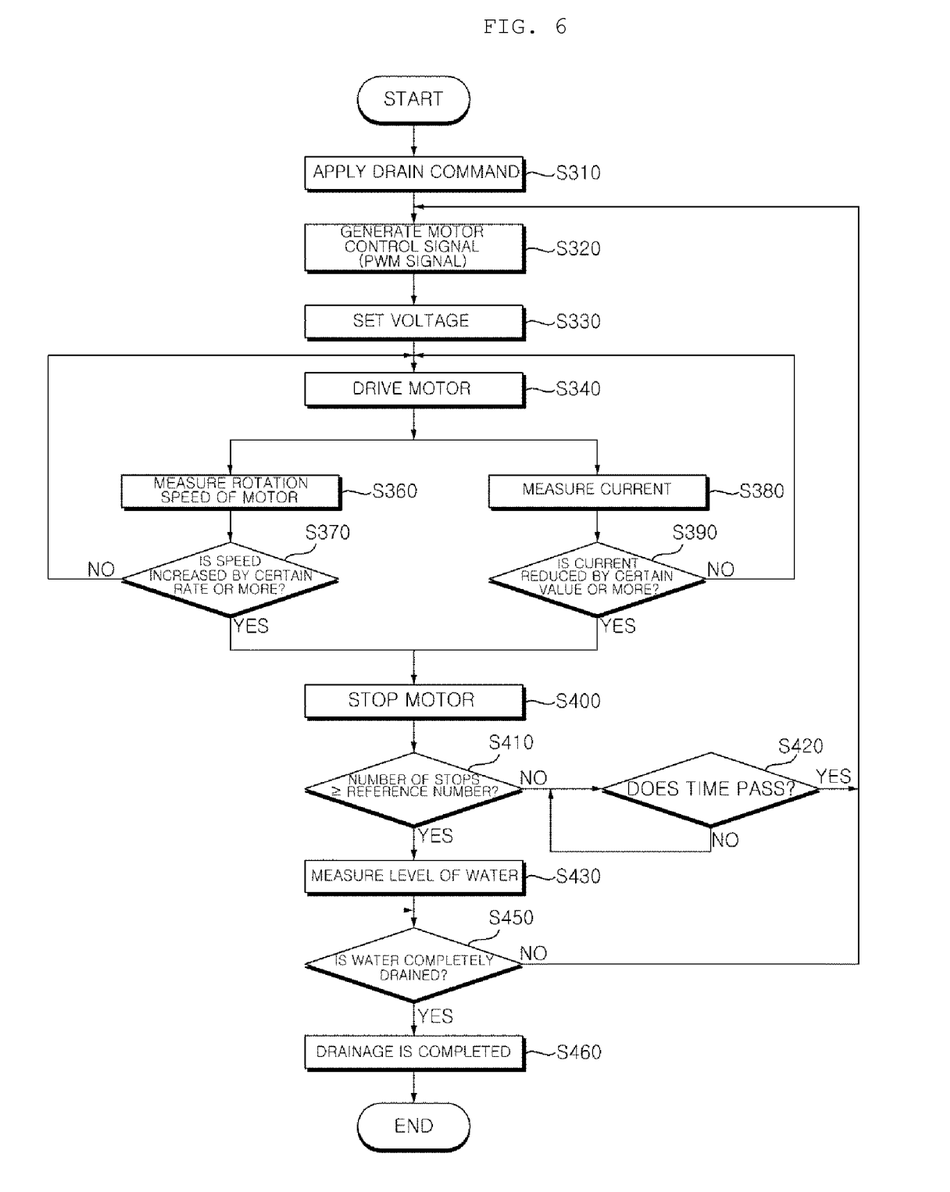
FIG. 6 is a flowchart of an example method for controlling the laundry treatment machine.

FIG. 6 illustrates an example method for controlling the laundry treatment machine 1.

If the washing machine 1 starts operation depending on setting data and drains water in a washing process or a rinsing process, the main controller 110 applies a drain command to the motor controller 120 (S310).

The motor controller 120 generates a control signal for controlling the motor 140 of the pump 11, and sets a voltage for setting a speed of the motor 140 (S320 and S330).

The motor driver 130 receives the control signal of the motor controller 120 and supplies driving power to the motor 140, and thus the motor 140 rotates and operates (S340).

In some implementations, the speed sensor 151 measures the rotation speed of the motor 140 (S360), and applies the measured rotation speed to the main controller 110 and the motor controller 120. The motor controller 120 generates a control signal for subsequent control of the motor 140 based on the input rotation speed.

The main controller 110 determines whether the measured rotation speed of the motor 140 is increased by a certain rate or more (S370). In some implementations, the main controller 110 determines whether the rotation speed of the motor 140 is increased by 33% or more compared to a pre-measured rotation speed.

If the rotation speed of the motor 140 is increased by the certain rate or more, the main controller 110 applies a motor stop command to the motor controller 120 (S400).

Meanwhile, the current sensor 152 measures a current applied from the motor driver 130 to the motor 140 (S380).

The main controller 110 compares the measured current value to a previous current value, and determines whether the current is reduced (S390). For example, the main controller 110 may determine whether the current is reduced by 90% or more.

If the current is reduced by a certain value or more, the main controller 110 applies a motor stop command to the motor controller 120 (S400).

Otherwise, if the current is not reduced or is reduced by a value less than the certain value, or if the speed is not increased or is increased by a rate less than the certain rate, the motor 140 continues operating. While the motor 140 operates, the rotation speed and the current value thereof are sensed and variations therein are monitored.

As such, the main controller 110 determines whether overcurrent is supplied to the motor 140, a load state, or whether the level of water is zero, based on the variations in the rotation speed and the current.

The main controller 110 stops the motor 140, counts the number of times that the motor 140 stops, and determines whether the number of times that the motor 140 stops is equal to or greater than a reference number (S410).

If the number of times that the motor 140 stops is less than the reference number, after a specific period of time passes (S420), the main controller 110 applies a motor driving command to the motor controller 120 to drive the motor 140 again.

Otherwise, if the number of times that the motor 140 stops is equal to or greater than the reference number, the main controller 110 controls the water level sensor 156 to measure the level of water (S430).

The main controller 110 determines whether water is completely drained to a designated level, based on the measured level of water (S450). If water is not completely drained, the motor 140 is driven again to operate the pump 11 again.

If water is completely drained, the main controller 110 determines that drainage is completed (S460), and the method proceeds to a subsequent process.

Therefore, a load state of water and an error in drainage due to, for example, foreign substances are sensed and overcurrent supplied to a motor is determined depending on variations in rotation speed and current value of the motor. Thus, operation of the motor is controlled. As such, the motor may be protected, may achieve noise reduction, and thus may be controlled more efficiently.

A laundry treatment machine and a method for controlling the same achieve the following effect. In operation of a pump for circulating and draining water, since the load of water to be drained is sensed and whether an error occurs due to foreign substances is determined based on a current and a rotation speed of a motor included in the pump, unnecessary operation of the pump may not be performed, damage of the pump due to overload may be prevented, noise due to pump operation in overloaded state may be solved, and the efficiency of pump control may be improved.

What is claimed is:

1. A laundry treatment machine comprising:
   a pump that is configured to drain or circulate water and that comprises a motor that is configured to operate the pump;
   a motor driver that is configured to supply operation power to the motor;
   a motor controller that is configured to set a rotation speed of the motor and that is configured to supply, to the motor driver, a signal that controls the motor;
   a current sensor that is configured to measure a current supplied from the motor driver to the motor;
   a speed sensor that is configured to measure the rotation speed of the motor;
   a water level sensor that is configured to measure a level of water in a tub; and
   a main controller that is configured to start or stop operation of the motor by supplying, to the motor controller, a control command,
   wherein the main controller is configured to stop the motor in response to determining a load state of water and determining whether the level of water is zero by measuring current using the current sensor and the rotation speed of the motor using the speed sensor.

2. The laundry treatment machine according to claim 1, wherein the motor controller is configured to stop the motor in response to a zero water level sensing signal or an overcurrent sensing signal from the main controller.

3. The laundry treatment machine according to claim 1, wherein the main controller is configured to determine whether overcurrent occurs or determine the load state based on the rotation speed of the motor being reduced and the current being increased.

4. The laundry treatment machine according to claim 1, wherein the main controller is configured to determine whether the level of water is zero based on the rotation speed being increased and the current being reduced.

5. The laundry treatment machine according to claim 1, wherein the main controller is configured to stop the motor based on the rotation speed being increased by at least a certain rate.

6. The laundry treatment machine according to claim 5, wherein the main controller is configured to stop the motor based on the rotation speed being increased by at least 33%.

7. The laundry treatment machine according to claim 1, wherein the main controller is configured to stop the motor based on the current being reduced by at least a certain value.

8. The laundry treatment machine according to claim 7, wherein the main controller is configured to stop the motor based on the current being reduced by at least 90%.

9. The laundry treatment machine according to claim 1, wherein the main controller is configured to:
   count a number of times that the motor stops; and
   determine whether water is completely drained by measuring the level of water using the water level sensor based on the number of times that the motor stops being equal to or greater than a reference number.

10. The laundry treatment machine according to claim 1, wherein the main controller is configured to:
    count a number of times that the motor stops; and
    control the motor to stop and then to be driven again after a specific period of time based on the number of times that the motor stops being less than a reference number.

* * * * *